D. HEER.

Assignor to H. D. HIRST.

LATHES.

No. 7,535. Reissued Feb. 27, 1877.

Witnesses, Harry Smith. Thomas M. Sloan

David Heer by his attys. Howson and Sm.

N. PETERS, PHOTO-LITHOGRAPHER, WASHINGTON, D. C.

UNITED STATES PATENT OFFICE.

DAVID HEER, OF PHILADELPHIA, PENNSYLVANIA, ASSIGNOR TO HENRY D. HIRST, OF SAME PLACE.

IMPROVEMENT IN LATHES.

Specification forming part of Letters Patent No. 141,347, dated July 29, 1873; reissue No. 7,535, dated February 27, 1877; application filed March 2, 1874.

*To all whom it may concern:*

Figure 1:
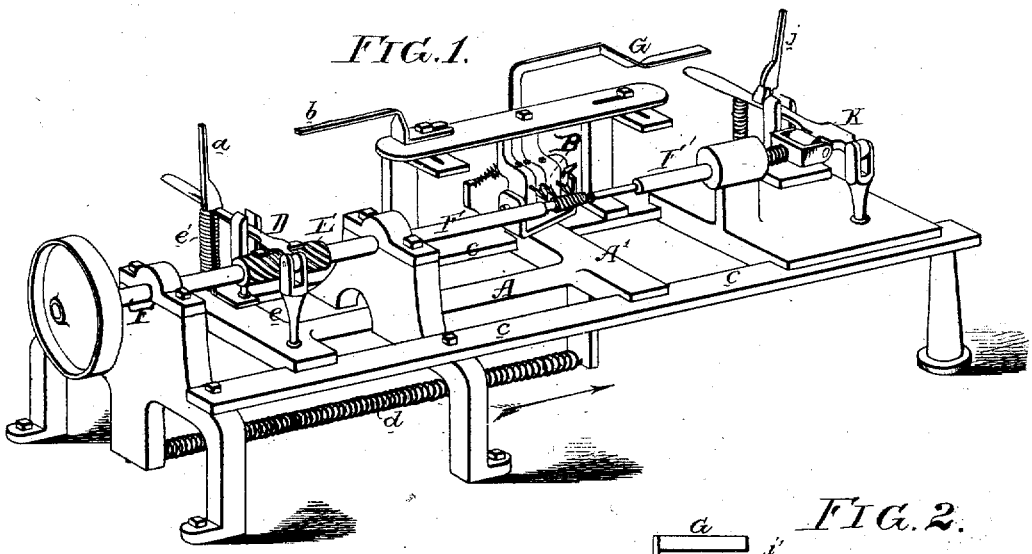
Figure 3:
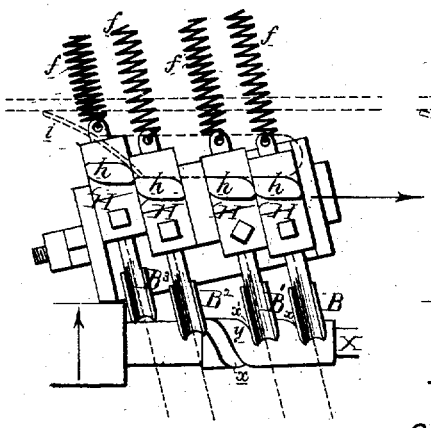

Be it known that I, DAVID HEER, of Philadelphia, Pennsylvania, have invented an Improvement in Lathes, of which the following is a specification:

The object of my invention is to rapidly and automatically cut spirals or flutings upon the surfaces of cylindrical or conical objects, such as chair-rounds, tassel-tops, &c.; and I accomplish this object by the use of the machine shown in the perspective view, Figure 1, of the accompanying drawing, the main peculiarities of which are a carriage, A, carrying a series of fluting-cutters, B, arranged in respect to each other, as best observed in the detached view, Fig. 3, the said carriage having an arm, D, a projection or projections, on which enter the spiral grooves of a revolving former, E, on the driving-spindle F, the carriage being thus caused to move in the direction of the arrow, so as to carry its cutters, which are forced outward by a fixed cam, past and in contact with the rotating tassel-top or other object to be fluted, the latter being retained between the driving-spindle and a rod, F′, as in a lathe, and being automatically released, when completed, by an arm, G, of the carriage, which strikes and releases certain retaining devices, by which the rod F′ is held against the said tassel-top, and after the drawing back of the cutters the whole carriage is, by action of a spring, restored to its original position, owing to the withdrawal of its arm D from the former E, which withdrawal is automatically accomplished by the striking of a trigger, *a*, against a fixed projection, *b*.

The construction and operation of the machine will be fully understood from the following detailed description.

Figure 2:
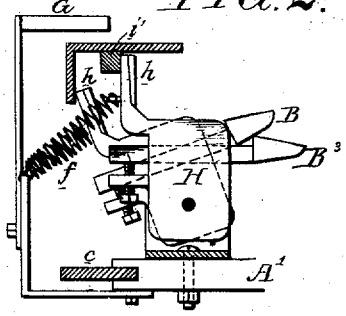

The carriage A slides upon guides *c* of the frame, directly beneath the driving-spindle F, and is constantly acted on by a spring, *d*, tending to draw it back, or in a direction contrary to that indicated by the arrow. On the driving-spindle there is a former, E, having spiral grooves cut upon it, corresponding to the character of the flutings which it is desired to cut in the tassel-top or other object, and into these grooves extends a projection or projections on the under side of an arm, D, hung to the carriage at *e*, constantly acted on by a spring, *e′*, tending to raise it, and held down by means of a spring-trigger, *a*, also attached to the carriage. The cutters, of which there are four in the present instance, marked respectively B, $B^1$, $B^2$, and $B^3$, are attached to levers H, hung to a projecting head, A′, of the carriage, as best observed in the enlarged views, Figs. 2, 3, and 4. Each of these levers is independent of the others, and is acted on by a spring, *f*, tending to draw its cutter back from the work, the latter (shown at X) being, in the present instance, a tassel-top secured to and rotating with the spindle F, and held against the same by the end pressure of a rod, F′, as in a lathe.

Figure 5:
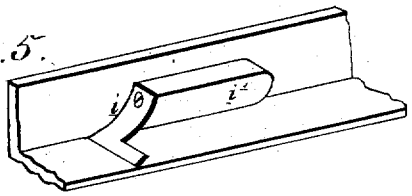

When the arm D is lowered onto the former E and the machine started, the projections of the said arm will be carried through the spiral grooves of the former, and the carriage will be consequently moved forward in the direction of the arrow, the arms *h* of the levers H striking a cam-like incline, *i*, on the fixed frame, and being turned by the same until their cutters are forced outward toward the tassel-top, against which they are held by a fixed projection, *i′*, of the frame until they have passed the tassel-top and cut the required flutings in the same, the character of these flutings being determined by the character of the grooves in the former E, from which the longitudinal movement of the carriage and cutters is derived, all of which will be more particularly referred to hereafter. After passing the tassel-top and fixed projection *i′*, each cutter, owing to the action of the spring upon its lever, drops back to its original position, as shown at the right-hand side of Fig. 4, and after the drawing back of all the cutters, which occurs on the completion of the fluting operation, an arm, G, of the carriage, which still continues its forward movement, strikes and pushes back a trigger, *j*, thus releasing and permitting the elevation of a spring cam-lever, K, the pressure of the latter against the rod F′ being thus relieved, and permitting the same to spring away from and release the tassel-top. The carriage still continues its forward movement until the trigger *a* strikes a fixed projection, *b*, when the said trigger is pushed back sufficiently to release the arm D, and permit the same to spring upward from the former E, the carriage, as soon as this occurs, being drawn bodily backward to its original position by the action of the spring *d*, before referred to; the arms *h* of the cutter-levers, during this rearward movement, passing behind the fixed projection *i'* and its incline *i*, the latter, as best observed in Fig. 5, being of the nature of a spring, so that it may yield and permit the rearward passage of the said arms. After the restoring of the parts to their original positions, another tassel-top or equivalent object is adjusted between the centers, and the work goes on, as before.

In ordinary machines of this class, the cutters, of which as many are employed as there are spiral grooves in the former, have been arranged closely together, or at precisely the same distance apart as the grooves in the said former.

Figure 4:
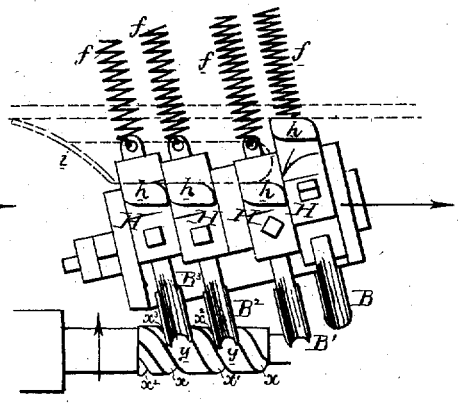

With this arrangement the successive flutings or grooves in the work must be formed by the cutters in their regular order, so that they must act upon the wood simultaneously, or nearly so, and at such short intervals that their combined pressure is sufficient to split the wood and destroy the blank. I overcome this objection by separating or spacing the cutters, and arranging them in sets, so that grooves with blank spaces between them shall be formed by one set of cutters, which blank spaces shall be removed by the next set of cutters, the strain upon the wood being thus materially reduced. For instance, the cutters B and $B^1$ of the first set, in Figs. 3 and 4, are arranged sufficiently far apart to cut grooves *x* and $x^1$ in the wood, with a blank space, *y*, between them, and the cutters $B^2$ and $B^3$ of the second set, which are similarly spaced, are so arranged, in respect to the cutters B and $B^1$, as to, in turn, remove the wood from the said blank spaces *y* between the grooves *x* and $x^1$, and to thus form the remaining grooves $x^2$ and $x^3$.

If six grooves were to be cut, a former, E, with six grooves would be required, and the six cutters would be arranged in three sets, so spaced that each set of cutters should act upon a blank portion of the wood.

I claim as my invention—

1. A fluting or threading lathe in which the cutters are spaced and arranged in sets, substantially as herein described, so that the cutters of one set shall form spiral grooves with blank spaces between them, which blank spaces shall be operated upon by the cutters of the next set or sets, as specified.

2. The combination of the arm G on the carriage, the spring-rod F', and the devices described, through the medium of which the said rod may be released by the arm.

3. The combination of the former E, arm D of the carriage, projection *b*, and trigger *a*, substantially as and for the purpose set forth.

In testimony whereof I have signed my name to this specification in the presence of two subscribing witnesses.

DAVID HEER.

Witnesses:
WM. A. STEEL,
HARRY SMITH.